US008214726B2

(12) United States Patent
Funabiki et al.

(10) Patent No.: US 8,214,726 B2
(45) Date of Patent: Jul. 3, 2012

(54) WIRELESS COMMUNICATION DEVICE TRANSMITTING AND RECEIVING CEC MESSAGES OF HDMI

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 865 days.

(21) Appl. No.: 12/301,510

(22) PCT Filed: May 21, 2007

(86) PCT No.: PCT/JP2007/060380
§ 371 (c)(1),
(2), (4) Date: Nov. 19, 2008

(87) PCT Pub. No.: WO2007/136037
PCT Pub. Date: Nov. 29, 2007

(65) Prior Publication Data
US 2009/0138779 A1 May 28, 2009

(30) Foreign Application Priority Data
May 19, 2006 (JP) .................................. 2006-140124

(51) Int. Cl.
*G06F 11/00* (2006.01)
(52) U.S. Cl. ....................................................... 714/786
(58) Field of Classification Search .................. 714/786
See application file for complete search history.

(56) References Cited

U.S. PATENT DOCUMENTS

| 2005/0165967 A1 | 7/2005 | Woolgar |
| 2008/0172708 A1* | 7/2008 | Perry et al. ..................... 725/110 |
| 2009/0089842 A1* | 4/2009 | Perry et al. ..................... 725/78 |
| 2010/0220669 A1* | 9/2010 | Jeon et al. ..................... 370/329 |

FOREIGN PATENT DOCUMENTS

| JP | 6-21923 | 1/1994 |
| JP | 9-326829 | 12/1997 |
| JP | 2000-332826 | 11/2000 |
| JP | 2005-524926 | 8/2005 |
| JP | 2005-244474 | 9/2005 |
| WO | 2007/037379 | 4/2007 |

OTHER PUBLICATIONS

International Search Report issued Aug. 21, 2007 in the International (PCT) Application No. PCT/JP2007/060380.
High-Definition Multimedia Interface Specification, Version 1.1, HDMI Licensing, LLC, California, USA, May 20, 2004.
International Preliminary Report on Patentability issued Dec. 24, 2008 in the International (PCT) Application No. PCT/JP2007/060380.

* cited by examiner

*Primary Examiner* — Bryce Bonzo
(74) *Attorney, Agent, or Firm* — Wenderoth, Lind & Ponack, L.L.P.

(57) ABSTRACT

When a wired interface circuit receives a CEC message destined for a node device connected through a wireless transceiver circuit, a CEC controller of a wireless node device outputs an ACK for the received CEC message from the wired interface circuit, and transmits a wireless data packet containing contents of the CEC message from the wireless transceiver circuit. The CEC controller also waits for the wireless interface transceiver circuit to receive a wireless ACK packet for the transmitted wireless data packet.

9 Claims, 12 Drawing Sheets

Fig.14

| CEC LOGICAL ADDRESS | CEC PHYSICAL ADDRESS | WIRELESS ADDRESS | FLAG |
|---|---|---|---|
| 0 | 0.0.0.0 | 1 | 0 |
| 1 | 1.0.0.0 | 2 | 0 |
| 3 | 2.0.0.0 | 3 | 1 |
| 4 | 3.0.0.0 | 4 | 1 |
| ... | ... | ... | |

Fig.15

| ORIGINATING LOGICAL ADDRESS | DESTINATION LOGICAL ADDRESS | DATA |
|---|---|---|
| 0 | 2 | ABC |
| 1 | 3 | EDF |
| ... | ... | ... |

1601 — ORIGINATING LOGICAL ADDRESS
1602 — DESTINATION LOGICAL ADDRESS
1603 — DATA
24A

WIRELESS COMMUNICATION DEVICE TRANSMITTING AND RECEIVING CEC MESSAGES OF HDMI

TECHNICAL FIELD

The present invention relates to a wireless communication device and a wireless communication system that enable efficient transmission of CEC messages of HDMI among a plurality of wireless communication devices.

BACKGROUND ART

In the prior art using CEC (Consumer Electronics Control) messages of HDMI (High-Definition Multimedia Interface), it has been known to transmit the CEC messages by wire (e.g., See Patent Document 1). The standard of HDMI is established in Non-Patent Document 1.

Now describe the transmission method of CEC messages in which two devices with an HDMI interface (an Source device and a Sink device) are connected to each other by wire using an HDMI cable and a CEC message is sent from one device to the other. A CEC message to be sent from a sender device (an Source device or a Sink device) is transmitted to a receiver device (a Sink device or an Source device) with the CEC message being contained in one frame.

FIG. 9 is a diagram showing an exemplary format of a CEC frame according to a prior art example and an embodiment of the present invention, and FIG. 10 is a diagram showing an exemplary format of a header block/data block according to a prior art example and an embodiment of the present invention. A CEC frame 1000 is composed of a start bit 1001, a header block 1002, and 0 or more data block(s) 1003. The start bit 1001 is a bit indicating the beginning of the CEC frame, and outputting a predetermined pulse waveform to a transmission path. The header block 1002 and the data block(s) 1003 have the same configuration with each other, and are composed of 8 information bits 1101, an EOM (End of Message) bit 1102, and a ACK bit 1103.

The information bit 1101 of the header block 1002 contains a logical address of the sender device (4 bits), and a logical address of the receiver device (4 bits). The information bit 1101 of the data block 1003 contains a code indicating an operation on the receiver device, etc. The EOM bit 1102 is set to "1" when the data block is the last data block of the CEC frame, and is set to "0" otherwise. The ACK bit 1103 is a bit used to determine whether or not the header block and the data block have been properly received by the receiver device, and is set to "1" by the sender device. When properly receiving the header block and the data block, the receiver device outputs "0" to ACK bits 1103.

In the header block and the data block, pulse waveforms indicating bit values "0" and "1" are continuously outputted to the transmission path. The receiver device detects the start bit 1001, and then samples pulse waveforms indicating the header block 1002 and the data blocks 1003 at predetermined timing, thus receives data.

Further, even in the case that a plurality of devices with an HDMI interface are connected to each other, since CEC lines are of bus connections, the sender device and the receiver device can operate in the same manner.

Patent Document 1: Japanese Patent laid-open Publication No. 2005-524926.

Non-Patent Document 1: High-Definition Multimedia Interface Specification, Version 1.1, HDMI Licensing, LLC, California in U.S.A., May 20, 2004.

SUMMARY OF THE INVENTION

Problems to be Solved by the Invention

However, when there is a wireless segment interposed between the sender device and the receiver device, the receiver device cannot return "0" at the predetermined timing for the ACK bits 1103 of the header block and the data block, thus resulting in retransmission of the CEC frame by the sender device. However, the receiver device cannot return "0" at the predetermined timing for the ACK bits also in response to the retransmitted CEC frame. That is, there is a problem that even if the sender device retransmits a plurality of times, the CEC message cannot be transmitted over the air from the sender device to the receiver device.

As a solution for this problem, one may think of a method in which an ACK is returned to the sender device by an intermediate wireless communication device, on behalf of the receiver device. In such a case, there is a possibility of failure of transmission of the CEC message between the wireless communication device having returned the ACK and the receiver device, and thus, it is unknown whether or not the CEC message sent from the sender device has been correctly received by the receiver device. Accordingly, it is common to use a method including: defining a response message to a certain CEC message, and determining that the CEC message has been correctly received by the receiver device when receiving the response message, and determining that the CEC message has not been correctly received when not receiving any response message for a predetermined period of time. However, this method has a problem that when the CEC message has not been correctly received, the sender device should wait a predetermined period of time, and thus, efficient transmission cannot be performed.

It is an object of the present invention to solve the above-described problems, and to provide a wireless communication device and a wireless communication system that enable efficient transmission of CEC messages among a plurality of wireless communication devices.

Means for Solving the Problem

According to the first aspect of the present invention, a wireless communication device transmitting and receiving CEC messages of HDMI is provided, including a wired interface, a wireless interface, node information storing means for storing information on node devices connected through the wired interface and information on node devices connected through the wireless interface, and control means for controlling transmission and reception through the wired interface and the wireless interface based on contents stored in the node information storing means. When the wired interface receives a CEC message destined for a node device connected through the wireless interface, the control means outputs an ACK signal for the received CEC message from the wired interface, transmits a wireless data packet containing contents of the CEC message from the wireless interface, and waits for the wireless interface to receive a wireless ACK packet for the transmitted wireless data packet.

In the wireless communication device, when the wireless interface has not received the wireless ACK packet even after expiration of a predetermined period of time from transmitting the wireless data packet, the control means outputs a receiving error message from the wired interface to an originating node device of the CEC message, the receiving error message indicating that the wireless ACK packet has not been received.

Moreover, in the wireless communication device, when the wireless interface receives a wireless NACK packet indicating that the wireless data packet has not been correctly transmitted, the control means outputs a receiving error message from the wired interface to an originating node device of the CEC message, the receiving error message indicating that the wireless NACK packet has been received.

Further, in the wireless communication device, when, even after expiration of a predetermined period of time from transmitting the wireless data packet, the wireless interface has not received either of the wireless ACK packet, and a wireless NACK packet indicating that the wireless data packet has not been correctly transmitted, the control means outputs a receiving error message from the wired interface to an originating node device of the CEC message, the receiving error message indicating that both of the wireless ACK packet and the wireless NACK packet have not been received.

Furthermore, in the wireless communication device, the receiving error message is a Feature Abort message.

Moreover, in the wireless communication device, the receiving error message contains a destination address of the wireless data packet.

Further, in the wireless communication device, the receiving error message contains a field for indicating a content of error.

According to the second aspect of the present invention, a wireless communication device transmitting and receiving CEC messages of HDMI is provided, including a wired interface, a wireless interface, and control means for controlling transmission and reception through the wired interface and the wireless interface. When the wireless interface receives a wireless data packet destined for a node device connected through the wired interface, the control means outputs a CEC message containing contents of the received wireless data packet from the wired interface, and after receiving an ACK signal for the CEC message from the wired interface, transmits a wireless ACK packet from the wireless interface.

In the wireless communication device, when the wired interface has not received an ACK signal for the CEC message even after expiration of a predetermined period of time from outputting the CEC message from the wired interface, the control means transmits a wireless NACK packet from the wireless interface, instead of the wireless ACK packet, the wireless NACK packet indicating that the wireless data packet has not been correctly transmitted.

According to the third aspect of the present invention, a wireless communication system is provided, including the wireless communication device of the first aspect of the present invention, and the wireless communication device of the second aspect of the present invention.

According to the present invention, even if there is a wireless segment interposed between the devices, it is possible to efficiently transmit CEC messages.

Effects of the Invention

In a wireless communication device and a wireless communication system according to the present invention, it is possible to efficiently transmit CEC messages among a plurality of wireless communication devices, thus improving user convenience.

BRIEF DESCRIPTION OF DRAWINGS

FIG. 14 is a diagram showing an exemplary format of a node information table in a node information memory 21B of FIG. 1.

FIG. 15 is a diagram showing an exemplary format of a transmission data memory 24A of FIG. 1.

Figure 1:
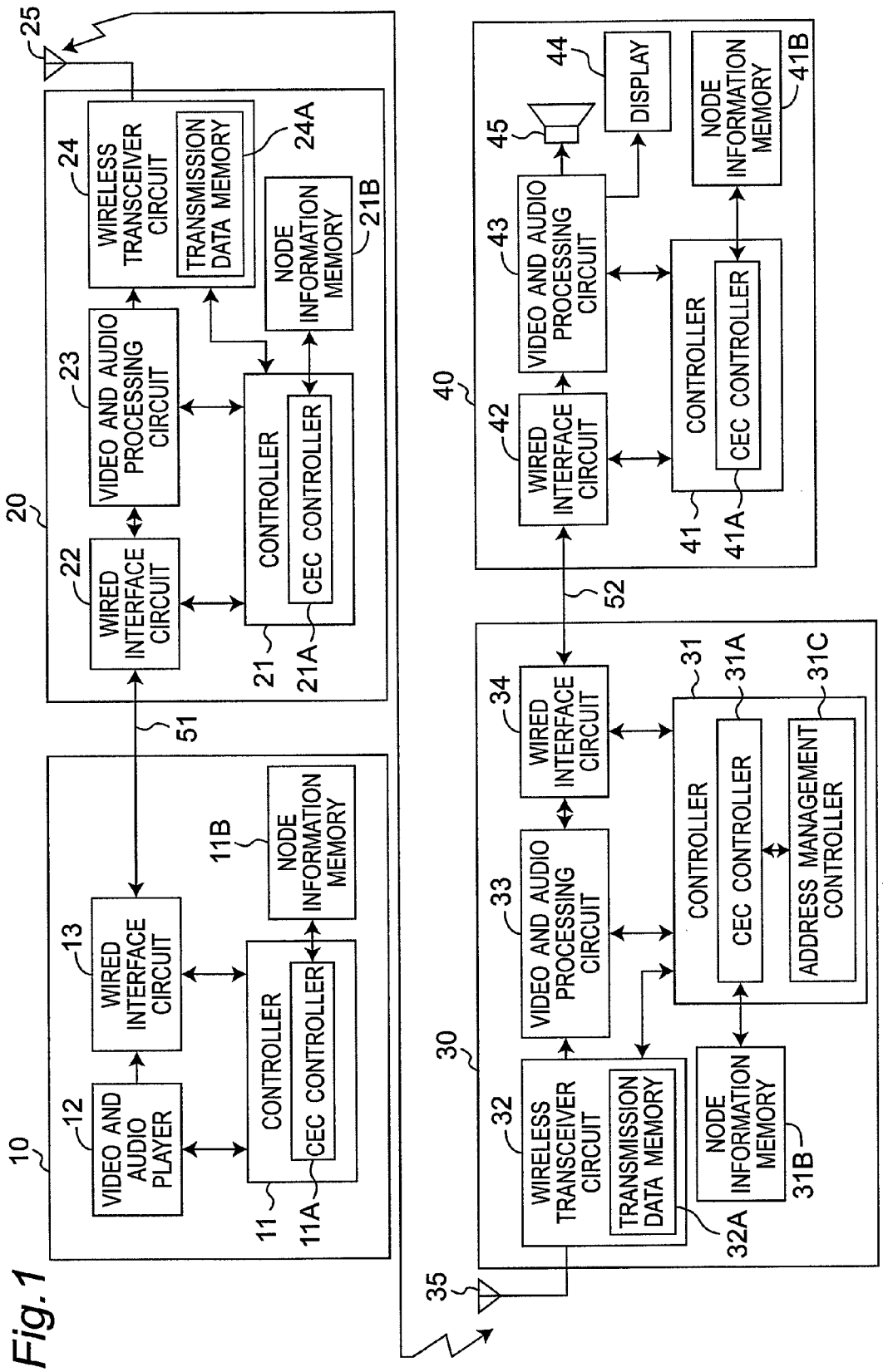
FIG. 1 is a diagram showing a configuration of a wireless communication system which is an embodiment according to the present invention.

DESCRIPTION OF REFERENCE NUMERALS 10 and 40 . . . wired node device,
20 and 30 . . . wireless node device,
11, 21, 31, and 41 . . . controller,
11a, 21a, 31a, and 41a CEC controller,
11B, 21B, 31B, and 41B . . . node information memory,
12 . . . video and audio player,
13, 22, 34, and 42 . . . wired interface circuit,
23, 33, and 43 . . . video and audio processing circuit,
24 and 32 . . . wireless transceiver circuit,
24a and 32a . . . transmission data memory,
25 and 35 . . . antenna,
31C . . . address management controller,
44 . . . display,
45 . . . speaker,
51 and 52 . . . HDMI cable,
101, 108, 202, and 1002 . . . header block,
103, 105, 110, 112, 201, 203, 205, and 1003 . . . data block,
102, 104, 106, 109, 111, 113, 202, 204, 206, and 1103 . . . ACK bit,
107 and 1200 . . . wireless data packet,
114 and 1300 . . . wireless ACK packet,
301 and 1400 . . . wireless NACK packet,
1000 . . . CEC frame,
1001 . . . start bit,
1100 . . . header block/data block, 1101 . . . information bit,
1102 . . . EOM bit,
1201 . . . MAC header field,
1202 . . . CEC frame field,
1301 . . . MAC header field,
1302 . . . identifier field,
1401 . . . MAC header field,
1402 . . . identifier field,
1403 . . . error code field,
1501 . . . logical address field,
1502 . . . physical address field,
1503 . . . wireless address field,
1504 . . . flag field,
1601 . . . originating logical address field,
1602 . . . destination logical address field,
1603 . . . data field,

DETAILED DESCRIPTION OF THE INVENTION

Embodiments according to the present invention will be described below with reference to the drawings.

PREFERRED EMBODIMENTS

FIG. 1 is a diagram showing a configuration of a wireless communication system which is an embodiment according to the present invention. Referring to FIG. 1, wired node devices 10 and 40 are configured as devices each provided with only a conventional HDMI wired interface, and wireless node devices 20 and 30 are configured as devices each provided with a wireless interface and a conventional HDMI wired interface. The wired node device 10 is connected to the wireless node device 20 through an HDMI cable 51, and similarly, the wired node device 40 is connected to the wireless node device 30 through an HDMI cable 52. These devices transmit data to each other using their wired interfaces. In addition, the wireless node device 20 and the wireless node device 30 transmit data using their wireless interfaces over a wireless segment.

The wired node device 10 includes a video and audio player 12 that is a tuner, or that reads out content information from a recording medium such as a DVD; a wired interface circuit 13 having an HDMI output terminal; and a controller 11 for controlling the video and audio player 12 and the wired interface circuit 13. The controller 11 includes a CEC controller 11A for controlling transmission and reception of CEC messages. The CEC controller 11A is connected with a node information memory 11B storing a node information table which contains the physical addresses and logical addresses of the respective devices in the system.

The wireless node device 20 includes a wired interface circuit 22 having an HDMI input terminal; a video and audio processing circuit 23 for recording content information or performing other processes; a wireless transceiver circuit 24 connected to an antenna 25, and serving as a wireless interface that performs processes such as transmission/reception and modulation/demodulation of radio signals; and a controller 21 for controlling the wired interface circuit 22, the video and audio processing circuit 23, and the wireless transceiver circuit 24. The input terminal of the wired interface circuit 22 is connected to the output terminal of the wired interface circuit 13 of the wired node device 10 through the HDMI cable 51, and thus, the wired node device 10 operates as an Source device and the wireless node device 20 operates as a Sink device. The wired interface circuit 22 may further have an HDMI output terminal. In addition, the controller 21 includes a CEC controller 21A for controlling transmission and reception of CEC messages. The CEC controller 21A is connected with a node information memory 21B storing a node information table which contains the physical addresses and logical addresses of the respective devices in the system and contains information required for transmission over the wireless segment. The wireless transceiver circuit 24 includes a transmission data memory 24A for buffering data to be sent over the air and storing the data for retransmission.

The wireless node device 30 includes a wireless transceiver circuit 32 connected to an antenna 35, and serving as a wireless interface that performs processes such as transmission/reception and modulation/demodulation of radio signals; a video and audio processing circuit 33 for recording content information or performing other processes; a wired interface circuit 34 having an HDMI output terminal; and a controller 31 for controlling the wireless transceiver circuit 32, the video and audio processing circuit 33, and wired interface circuit 34. The wired interface circuit 34 may further have an HDMI input terminal. The controller 31 includes a CEC controller 31A for controlling transmission and reception of CEC messages; and an address management controller 31C for assigning an address to each of all the node devices in the wireless communication system, for transmission over the wireless segment. The CEC controller 31A is connected with a node information memory 31B storing a node information table which contains the physical addresses and logical addresses of the respective devices in the system and contains information required for transmission over the wireless segment. The wireless transceiver circuit 32 includes a transmission data memory 32A for buffering data to be sent over the air and storing the data for retransmission.

The wired node device 40 includes a wired interface circuit 42 having an HDMI input terminal; a video and audio processing circuit 43 for processing the transmitted content information for playback; and a controller 41 for controlling the wired interface circuit 42 and the video and audio processing circuit 43. The input terminal of the wired interface circuit 42 is connected to the output terminal of the wired interface circuit 34 of the wireless node device 30 through the HDMI cable 52, and thus, the wireless node device 30 operates as an Source device and the wired node device 40 operates as a Sink device. A display 44 and a speaker 45 are connected to the video and audio processing circuit 43. In addition, the controller 41 includes a CEC controller 41A for controlling transmission and reception of CEC messages. The CEC controller 41A is connected with a node information memory 41B storing a node information table which contains the physical addresses and logical addresses of the respective devices in the system.

Each of the wireless transceiver circuits 24 and 32 includes a radio frequency circuit, a baseband processing circuit, a medium access control circuit, etc., and can use arbitrary wireless transmission scheme; its further explanation is omitted in the present embodiment. For example, it is possible to use a wireless transmission scheme defined in IEEE 802.11 using radio wave in 2.4 GHz band or 5 GHz band, or a wireless transmission scheme using radio wave in millimeter wave band.

At first, the CEC controller 21A of the wireless node device 20 collects information on the respective node devices in the wireless communication system, and stores the information in the node information table in the node information memory 21B. Firstly, the CEC controller 21A of the wireless node device 20 stores a logical address and a physical address of the wireless node device 20 itself, and a logical address and a physical address of the wired node device 10 which are notified by a report physical address message from the wired node device 10, in the node information table in the node information memory 21B. The CEC controller 21A then sets flags in the node information table in the node information memory 21B such that a flag for the wireless node device 20 itself is set to 1, and a flag for the wired node device 10 connected by wire to the wireless node device 20 is set to 1. These flag indicate whether or not each node device in the node information table is connected to the wireless node device 20 by wire (flag value=1: flag value=1 is also set for the wireless node device 20 itself) or over the wireless segment (flag value=0). Subsequently, the CEC controller 21A obtains wireless addresses for transmission over the wireless segment, from the address management controller 31C of the wireless node device 30.

The address management controller 31C of the wireless node device 30 performs an address management process by which a wireless address for transmission over the wireless segment is assigned to each of all the node devices in the wireless communication system. The wireless addresses to be assigned are device identifiers for uniquely identifying each node device in the wireless communication system. Available device identifiers include, for example, MAC addresses, or device IDs for uniquely identifying each device and with fewer bits than that of the MAC addresses, etc., and alternatively, any device identifiers can be used as long as one can uniquely identify each node device. In the address management process, each node device performs an authentication process with the address management controller 31C when joining the wireless communication system, and after completion of the authentication process, a wireless address is assigned to each node device. In the present embodiment, the CEC controller 21A of the wireless node device 20 obtains a wireless address for the wireless node device 20 from the address management controller 31C, and obtains a wireless address for the wired node device 10 connected by wire to the wireless node device 20, from the address management controller 31C, by performing an authentication process with the address management controller 31C on behalf of the wired node device 10, and then, the CEC controller 21A stores the wireless addresses in the node information table in the node information memory 21B.

Similarly, the address management controller 31C of the wireless node device 30 obtains wireless addresses for the wireless node device 30 and the wired node device 40, and stores the wireless addresses in the node information table in the node information memory 31B. In this manner, the address management controller 31C assigns a wireless address to each of all the node devices in the wireless communication system (regardless of whether the device is wired or wireless).

Furthermore, the CEC controller 21A of the wireless node device 20 performs an address registration process, which will be described below, for obtaining information on the wireless node device 30 connected over the wireless segment and information on the wired node device 40, and stores the obtained information in the node information table in the node information memory 21B.

Figure 11:
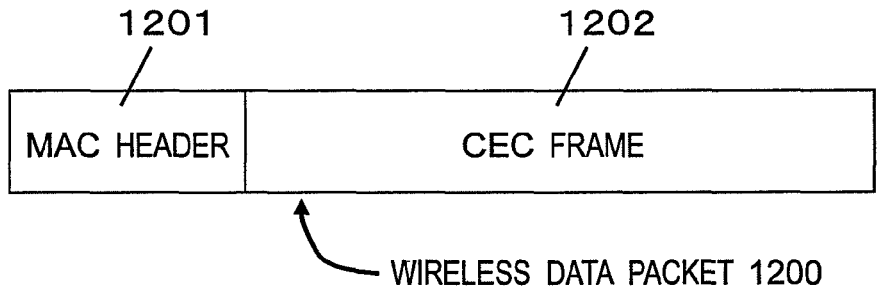
FIG. 11 is a diagram showing an exemplary format of a wireless data packet 1200 of FIGS. 3 and 4.

FIG. 11 is a diagram showing an exemplary format of a wireless data packet to be sent and received between the wireless node devices 20 and 30. Referring to FIG. 11, a MAC header carrying field 1201 is a field for containing a header including information such as a destination wireless address and an originating wireless address, and a CEC frame carrying field 1202 is a field for containing a CEC frame. The CEC frame 1000 may be contained such that the start bit 1001 of the CEC frame 1000 is deleted. Furthermore, the CEC frame 1000 may be contained such that the EOM bit 1102 and the ACK bit 1103 of each of the header block 1002 and the data block 1003 are deleted.

Figure 2:
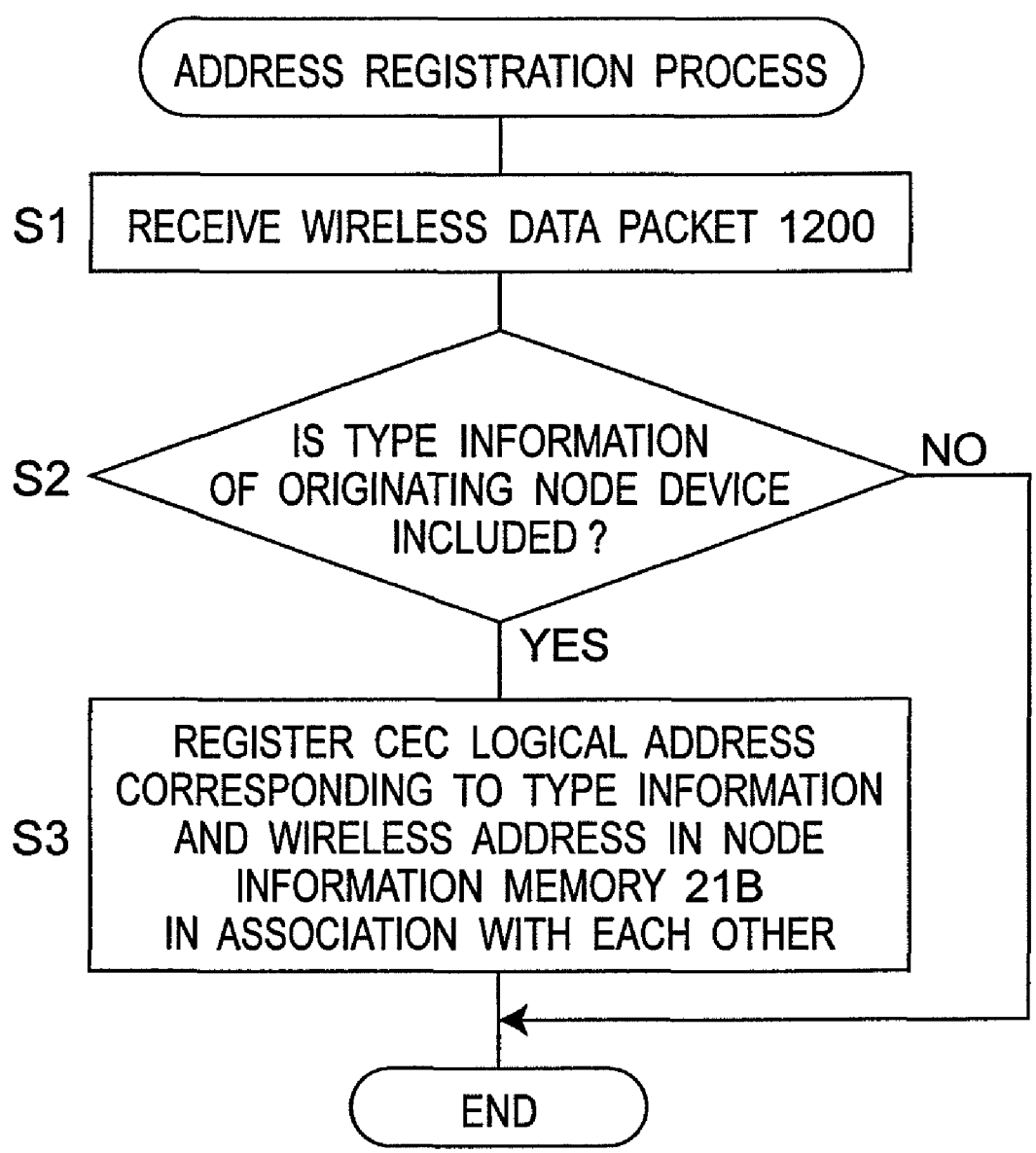
FIG. 2 is a flowchart of an address registration process performed by a CEC controller 21A of a wireless node device 20 of FIG. 1.

FIG. 2 is a flowchart of an address registration process performed by the CEC controller 21A of the wireless node device 20. At step S1 of FIG. 2, the wireless transceiver circuit 24 receives a wireless data packet 1200, and then, the CEC controller 21A determines at step S2 whether or not the wireless data packet 1200 contains type information of an originating node device (type such as a television device, DVD player, or set-top box), and if YES then the process proceeds to step S3, and if NO then the process ends. At step S3, the CEC controller 21A registers a logical address corresponding to the type information of the originating node device, and an originating wireless address contained in the MAC header 1201, in the node information table in the node information memory 21B, in association with each other. Further, the CEC controller 21A sets the flag indicating whether or not the originating node device is a device connected by wire to the wireless node device 20 such that the flag is set to 0, and then, ends the address registration process.

FIG. 14 is a diagram showing an exemplary format of the node information table in the node information memory 21B. Referring to FIG. 14, for example, items 1511, 1512, 1513, and 1514 of the first to fourth rows are respectively provided for the node devices 40, 30, 20, and 10. In the items 1511 and 1512 of the first and second rows (corresponding to the wired node device 40 and the wireless node device 30, respectively), a logical address field 1501 stores an originating logical address contained in the header block 1002 of each CEC frame 1000 received over the wireless segment, a physical address field 1502 stores a physical address associated with the originating logical address, a wireless address field 1503 stores an originating wireless address contained in the MAC header, and furthermore, a flag field 1504 is 0 because the wireless segment is interposed between the wireless node device 20 and the wireless node device 30, the wired node device 40. In addition, in the items 1513 and 1514 of the third and fourth rows (corresponding to the wireless node device 20 and the wired node device 10, respectively), the wireless address field 1503 stores, as described above, a wireless address assigned by the address management controller 31C of the wireless node device 30, and furthermore, the flag field 1504 is 1 because a wireless segment is not interposed. It is noted that the node information table should contain at least one of the logical address field 1501 and the physical address field 1502. It is also noted that the wireless address field 1503 may store the MAC addresses, as described above, or alternatively, store any information other than the MAC addresses as long as one can uniquely identify the devices.

Further, the CEC controller 31A of the wireless node device 30 also performs the same processes as the above-described processes associated with the node information memory 21B, and information on each node device is stored in the node information table in the node information memory 31B. It is noted that of course, the node information tables in the node information memory 11B of the wired node device 10 and the node information memory 41B of the wired node device 40 have a flag field and a wireless address field.

As described above, the respective wireless node devices 20 and 30 obtain the wireless addresses of the respective node devices in the wireless communication system. Thus, when a node device connected by wire to a certain wireless node device communicates with a node device connected by wire to another wireless node device, for example, when the wired node device 40 sends a CEC message to the wired node device 10, the wired node device 40 sends a CEC message to the wireless node device 30, and the wireless node device 30 sends the message over the air to a wireless address for the wired node device 10 which is obtained from the address management controller 31C by the wireless node device 20 on behalf of the wired node device 10. When receiving this message, the wireless node device 20 refers to the node information table in the node information memory 21B, and sends the CEC message to a logical address associated with the wireless address of the wired node device 10, thus transmitting the CEC message from the wired node device 40 to the wired node device 10. Accordingly, when the wireless node device 20 has a plurality of wireless addresses in the node information table in the node information memory 21B and receives a CEC message destined for a certain wireless address, the wireless node device 20 converts the CEC message into a message destined for a logical address of one of the wired node devices associated with the respective wireless addresses, and transmits the message to the wired node device. The same also applies to the wireless node device 30.

Figure 4:
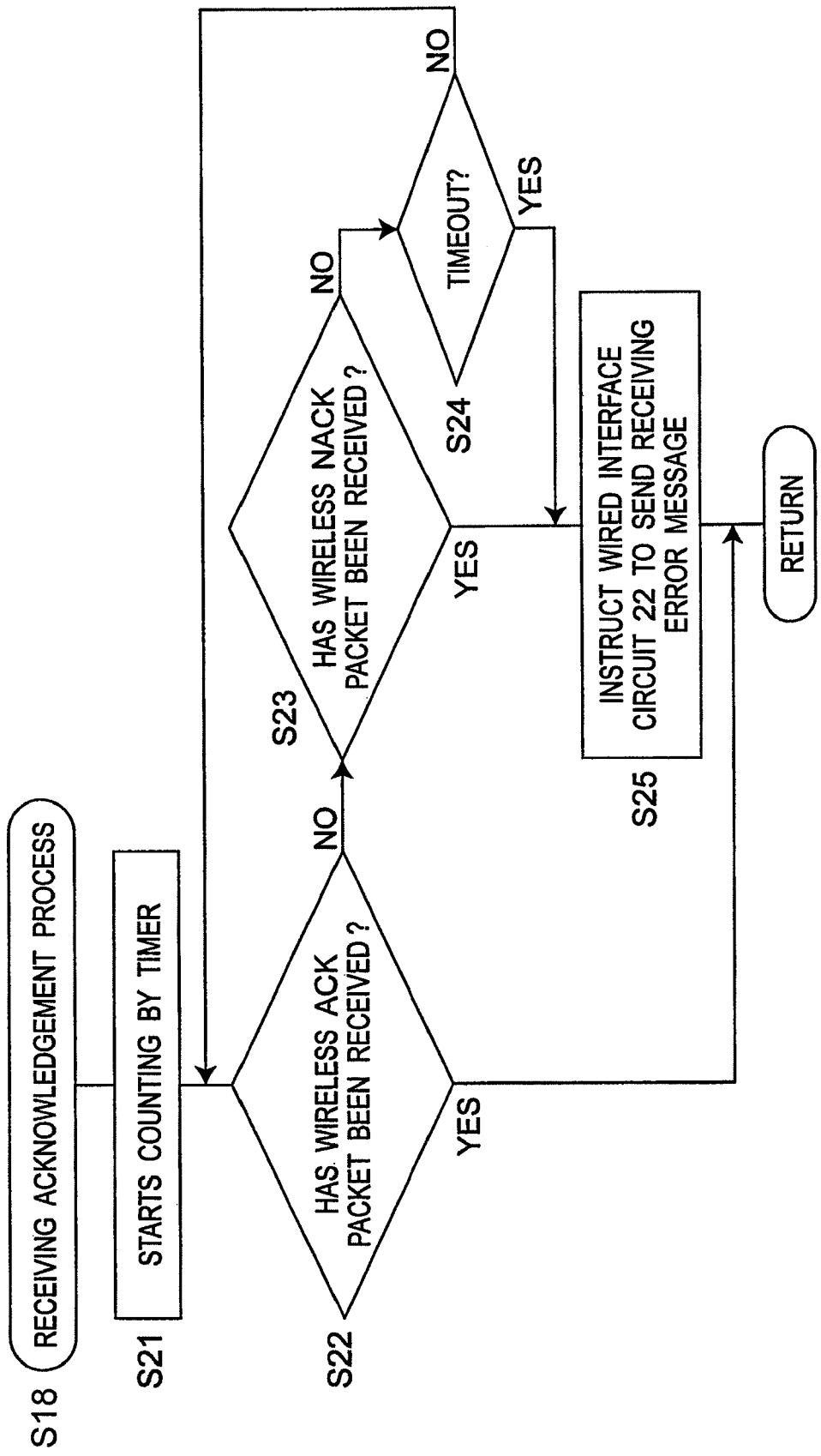
FIG. 4 is a flowchart showing a subroutine of a receiving acknowledgement process at step S18 of FIG. 3.
Figure 5:
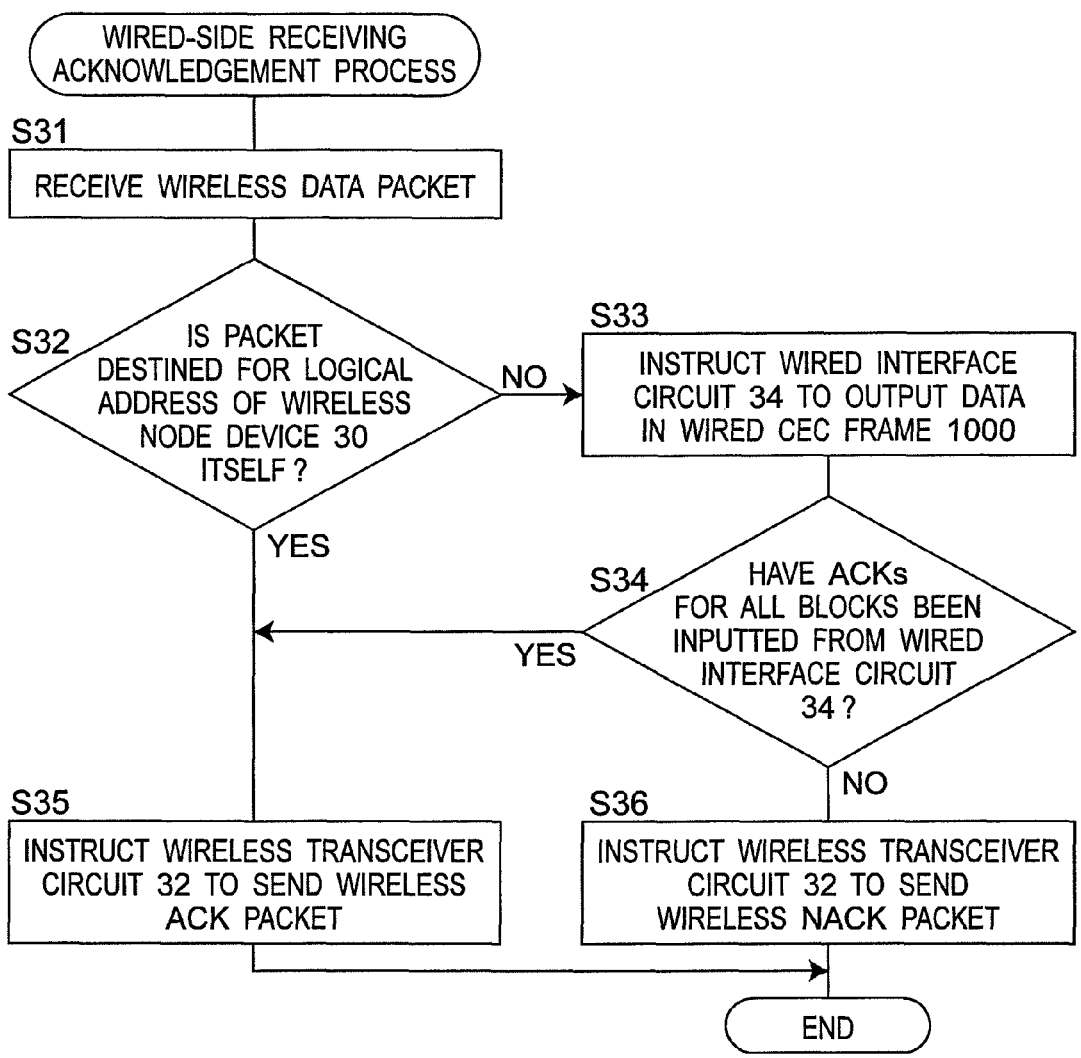
FIG. 5 is a flowchart showing a wired-side receiving acknowledgement process performed by a CEC controller 31A of a wireless node device 30 of FIG. 1.

A proxy response process and a wired-side receiving acknowledgement process in the embodiment according to the present invention will be described below with reference to flowcharts of FIGS. 3 to 5. In an example of FIGS. 3 to 5, discuss a case in which a CEC message is transmitted from the wireless node device 20 to the wireless node device 30. In this case, FIGS. 3 and 4 show flowcharts of processes performed by the CEC controller 21A of the wireless node device 20, and FIG. 5 shows a flowchart of a process performed by the CEC controller 31A of the wireless node device 30.

Figure 3:
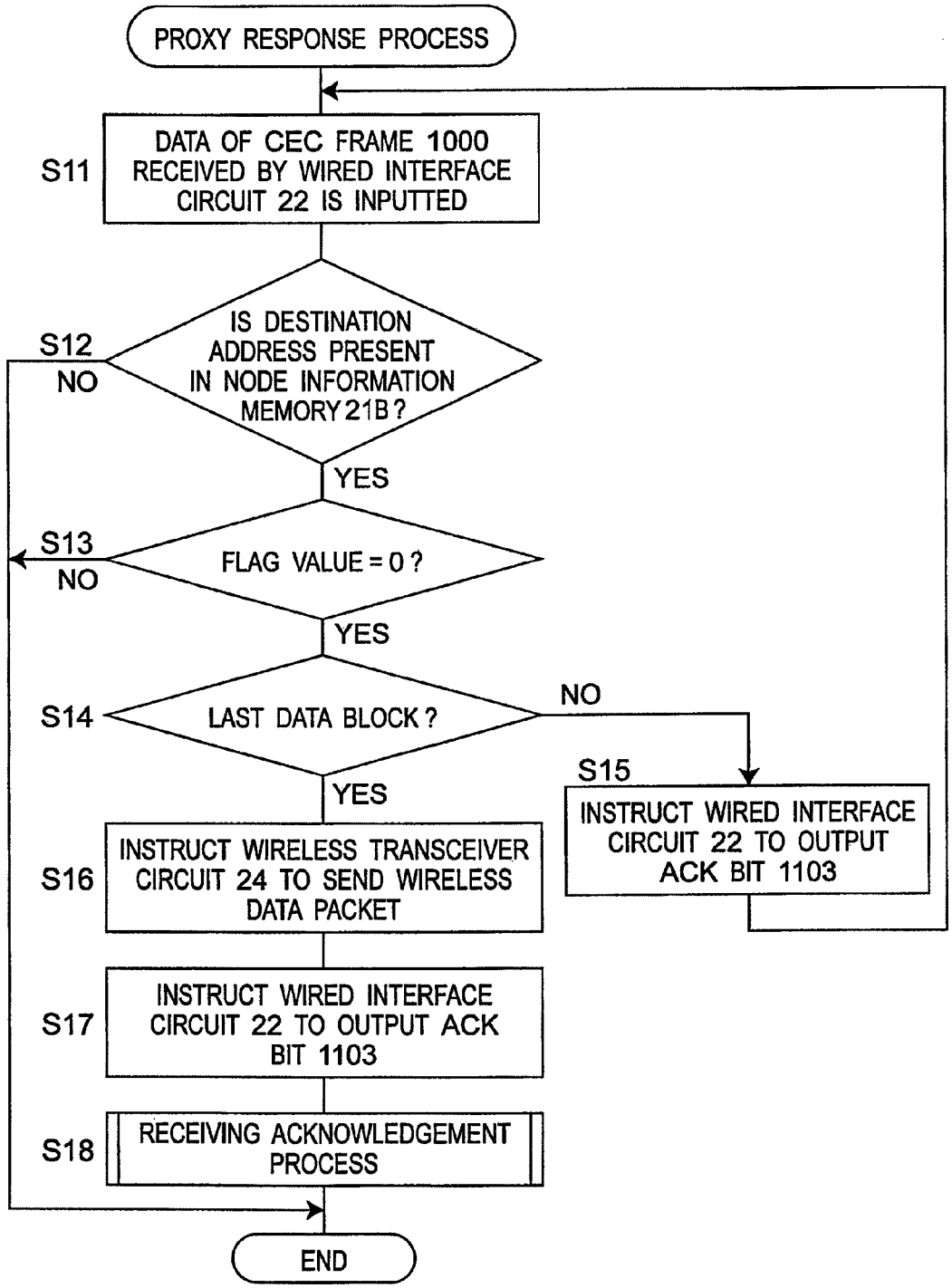
FIG. 3 is a flowchart showing a proxy response process performed by the CEC controller 21A of the wireless node device 20 of FIG. 1.

FIG. 3 is a flowchart showing a proxy response process performed by the CEC controller 21A of the wireless node device 20 of FIG. 1. At step S11 of FIG. 3, firstly, the CEC controller 21A of the wireless node device 20 starts receiving a CEC frame 1000 at the time when a start bit 1001 is detected by the wired interface circuit 22. When data of the CEC frame 1000 received by the wired interface circuit 22 is inputted, the CEC controller 21A refers to its header bock 1002 and determines, at step S12, whether or not a destination logical address contained in the header block 1002 is present in the node information table in the node information memory 21B, and if YES then the process proceeds to step S13, and if NO then the process ends. At step S13, in order to determine whether or not transmission of a wireless data packet is required, the CEC controller 21A determines whether or not 0 is set to a flag value corresponding to the destination logical address in the node information table in the node information memory 21B, and if YES then the process proceeds to step S14, and if NO then the process ends. The case in which the proxy response process is not required (NO at step S12 or S13) corresponds to the case in which transmission of a wireless data packet is not required, e.g., including case in which the flag value=1, and accordingly, the logical address that matches the destination logical address in the node information table in the node information memory 21B is one that was contained in the header block 1002 of the CEC frame 1000 previously inputted from the wired interface circuit 22, and is associated with the wireless address assigned by the address management controller 31C, or the case in which in the node information table in the node information memory 21B, no logical address matches the destination logical address contained in the header block 1002 of the CEC frame 1000 inputted from the wired interface circuit 22. When the flag value=1 in the node information table in the node information memory 21B, a destination of the CEC frame 1000 received by the wired interface circuit 22 is the wireless node device 20 itself, or is another node device (not shown) connected by wire to the wireless node device 20 or the wired node device 10, and then, the destined node device performs a response process as specified in Non-Patent Document 1.

On the other hand, when transmission of a wireless data packet is required (i.e., when a logical address that matches the destination logical address contained in the header block 1002 of the CEC frame 1000 inputted from the wired interface circuit 22 at step S11 is present in the node information table in the node information memory 21B, and the associated flag value=0), the CEC controller 21A stores data contained in the CEC frame 1000 and to be sent over the air, in the transmission data memory 24A. The CEC controller 21A then sets a destination wireless address of a MAC header 1201 of a data packet to be sent over the air, based on the destination logical address contained in the header block 1002 of the CEC frame 1000 inputted from the wired interface circuit 22, by referring to the node information table in the node information memory 21B, such that a wireless address, stored in the wireless address field 1503 associated with the logical address field 1502 being set with the same logical address as the destination logical address contained in the header block 1002, is set to the destination wireless address of the MAC header 1201. Subsequently, at step S14, the CEC controller 21A determines, by referring to the EOM bits 1102 in the header block 1002 and the data block 1003 of the CEC frame 1000 received at step S11, whether or not currently received data is the last data block, and if YES then the process proceeds to step S16, and if NO then the process proceeds to step S15.

When the currently received data is not the last data block (i.e., the EOM bits 1102 are "0"), then at step S15, the CEC controller 21A outputs "0", to the wired interface circuit 22 at output timing for the ACK bits 1103, and returns to step S11 to wait to receive subsequent data. On the other hand, when the currently received data is the last data block, then at step S16, the CEC controller 21A instructs the wireless transceiver circuit 24 to send a wireless data packet 1200 containing the inputted CEC frame, and at step S17, outputs "0" to the wired interface circuit 22 at the output timing for the ACK bits 1103, and performs a receiving acknowledgement process at step S18 (described later with reference to FIG. 4).

FIG. 15 is a diagram showing an exemplary format of the transmission data memory 24A. Referring to FIG. 15, an originating logical address field 1601 is a field for storing an originating logical address contained in a wireless data packet, a destination logical address field 1602 is a field for storing a destination logical address contained in the wireless data packet, and a data field 1603 is a field for storing data contained in the wireless data packet. These addresses and data are stored in the transmission data memory 24A each time data to be sent over the air is received. Even after the wireless data packet is sent at step S16, such addresses and data may remain stored in the transmission data memory 24A for retransmission.

FIG. 4 is a flowchart showing a subroutine of the receiving acknowledgement process at step S18 of FIG. 3. Referring to FIG. 4, after the CEC controller 21A instructs the wireless transceiver circuit 24 to send a wireless data packet 1200, at step S21, the CEC controller 21A starts counting by an internal timer (not shown) for waiting to receive a wireless ACK packet or wireless NACK packet from the wireless node device 30.

Figure 12:
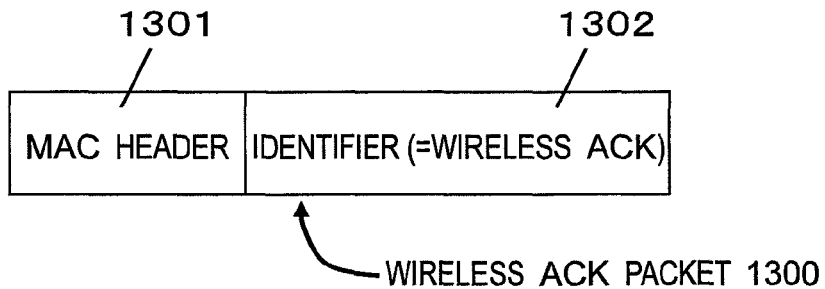
FIG. 12 is a diagram showing an exemplary format of a wireless ACK packet 1300 of FIGS. 4 and 5.

FIG. 12 is a diagram showing an exemplary format of a wireless ACK packet of FIGS. 4 and 5. Referring to FIG. 12, a MAC header carrying field 1301 is a field for containing a header including information such as a destination wireless address and an originating wireless address, and an identifier field 1302 is a field for containing a value indicating that the packet is a wireless ACK packet.

Figure 13:
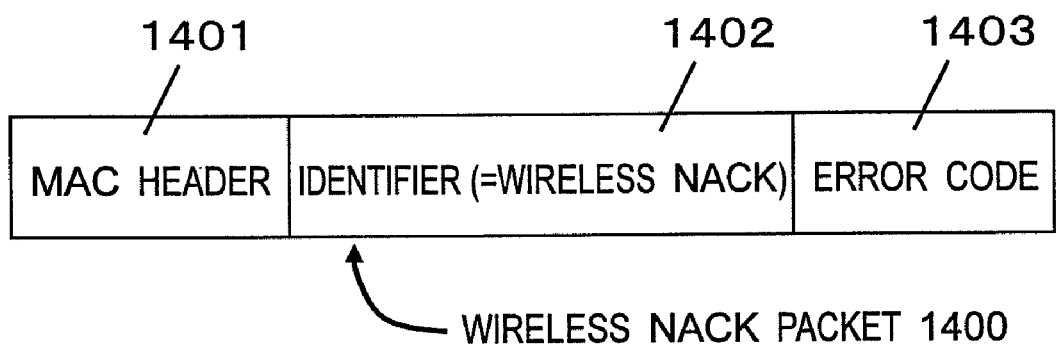
FIG. 13 is a diagram showing an exemplary format of a wireless NACK packet 1400 of FIGS. 4 and 5.

FIG. 13 is a diagram showing an exemplary format of a wireless NACK packet of FIGS. 4 and 5. Referring to FIG. 13, a MAC header carrying field 1401 is a field for containing a header including information such as a destination wireless address and an originating wireless address, an identifier field 1402 is a field for containing a value indicating that the packet is a wireless NACK packet, and an error code field 1403 is a field for containing a value indicating the type of error. For example, the error codes contained in the error code field 1403 may define a code indicating that an ACK has not been returned for a header block, a code indicating that an ACK has not been returned for a data block, etc.

When, at step S22, a notification indicating that a wireless ACK packet has been received is inputted from the wireless transceiver circuit 24, then the CEC controller 21A ends the proxy response process. On the other hand, when, at step S23, a notification indicating that a wireless NACK packet has been received is inputted from the wireless transceiver circuit 24, then at step S25, the CEC controller 21A instructs the wired interface circuit 22 to send a receiving error message, and ends the proxy response process. Alternatively, when a wireless ACK packet and a wireless NACK have not been received even after expiration of a predetermined timeout period (YES at S24), the CEC controller 21A instructs, at step S25, the wired interface circuit 22 to send a receiving error message and ends the proxy response process, in a similar manner as that of the case that a wireless NACK packet has been received.

In this case, the length of a timeout period, during which the CEC controller 21A of the wireless node device 20 waits to receive a wireless ACK packet or wireless NACK packet from the wireless node device 30, is set to a time shorter than a predetermined period of time during which the CEC controller 21A waits to receive a response message for a CEC message. As the receiving error message, a Feature Abort message defined in HDMI may be used (See Non-Patent Document 1). Alternatively, the receiving error message may be defined as a new CEC message. In such a case, it is possible to distinguish errors from each other, such as an error when receiving a wireless NACK packet and an error due to a timeout, by adding information indicating a content of error to a receiving error message. Accordingly, when receiving a receiving error message indicating that a wireless NACK packet has been received, it can be determined that an error has occurred not in the wireless segment, but in the wired segment located farther from the wireless segment; and when receiving a receiving error message indicating a timeout, it can be determined that an error has occurred in the wireless segment. The determination results serve as bases for determining how to process subsequent messages to be sent. For example, when it is determined that an error has occurred in the wireless segment, it is possible to determine not to send CEC messages through a wireless node device through which the error has occurred. Alternatively, when it is determined that an error has occurred in the wired segment, it is possible to determine not to send CEC messages destined for a wired node device that was the destination device when the error has occurred, or CEC messages destined for a wired node device located farther from the wired node device that was the destination device when the error has occurred.

FIG. 5 is a flowchart showing a wired-side receiving acknowledgement process performed by the CEC controller 31A of the wireless node device 30. Referring to FIG. 5, when the CEC controller 31A receives a wireless data packet 1200 from the wireless node device 20 at step S31, then at step S32, the CEC controller 31A determines whether or not a destination logical address contained in a header block 1002 of a CEC frame contained in the wireless data packet 1200 matches a logical address of the wireless node device 30 itself, and if YES then the process proceeds to step S35, and if NO then the process proceeds to step S33. At step S35, the CEC controller 31A instructs the wireless transceiver circuit 32 to send a wireless ACK packet to an originating wireless address of the wireless data packet 1200, and ends the wired-side receiving acknowledgement process.

On the other hand, at step S33, the CEC controller 31A instructs the wired interface circuit 34 to output a start bit 1001, and a header block 1002 and a data block 1003 corresponding to the received CEC frame. Then, at step S34, the CEC controller 31A determines whether or not ACKs for the header block and all data blocks have been received from the wired interface circuit 34, and if YES then the process proceeds to step S35, and if NO then the process proceeds to step S36. At step S35, since the ACKs for the header block and all data blocks have been received, the CEC controller 31A instructs the wireless transceiver circuit 32 to send a wireless ACK packet to the originating wireless address of the wireless data packet 1200, and ends the wired-side receiving acknowledgement process. On the other hand, when ACKs for the header block or data blocks have not been received even after expiration of the predetermined period of time from outputting the header block or data blocks from the wired interface circuit 22, i.e., when ACKs for the header block or data blocks have not been received even after retransmitting the header block and data blocks a plurality of times (NO at step S34), then at step S36, the CEC controller 31A instructs the wireless transceiver circuit 32 to send a wireless NACK packet to the originating wireless address of the wireless data packet 1200, and ends the wired-side receiving acknowledgement process.

As described above, the CEC controller 21A of the wireless node device 20 determines whether or not to perform a proxy response, using the value of each flag in the node information table in the node information memory 21B. The node information table in the node information memory 21B stores information on node devices connected by wire to the wireless node device (logical addresses, flags, and wireless addresses), and particularly, stores a logical address of each node device, and a flag indicating whether or not the logical address is obtained through the wired interface circuit 22 of the wireless node device 20 itself, in association with each other. An entry for a node device connected by wire has a format "flag=1; a wireless address=an address obtained on behalf of the node device from the address management controller 31C of the wireless node device 30". On the other hand, "flag=0" in an entry for a node device connected over the wireless segment, which is obtained by the process of FIG. 2. The CEC controller 21A does not perform the proxy response when the destination of a CEC frame 1000 received by the wired interface circuit 22 is a node device with "flag=1", and performs the proxy response when "flag=0". Hence, when the wired interface circuit 22 receives a CEC message destined for a node device connected through the wireless transceiver circuit 24, the CEC controller 21A of the wireless node device 20 outputs an ACK for the received CEC message from the wired interface circuit 22, and sends a wireless data packet containing contents of the CEC message from the wireless transceiver circuit 24, and the wireless interface transceiver circuit 24 waits to receive a wireless ACK packet for the sent wireless data packet.

Figure 6:
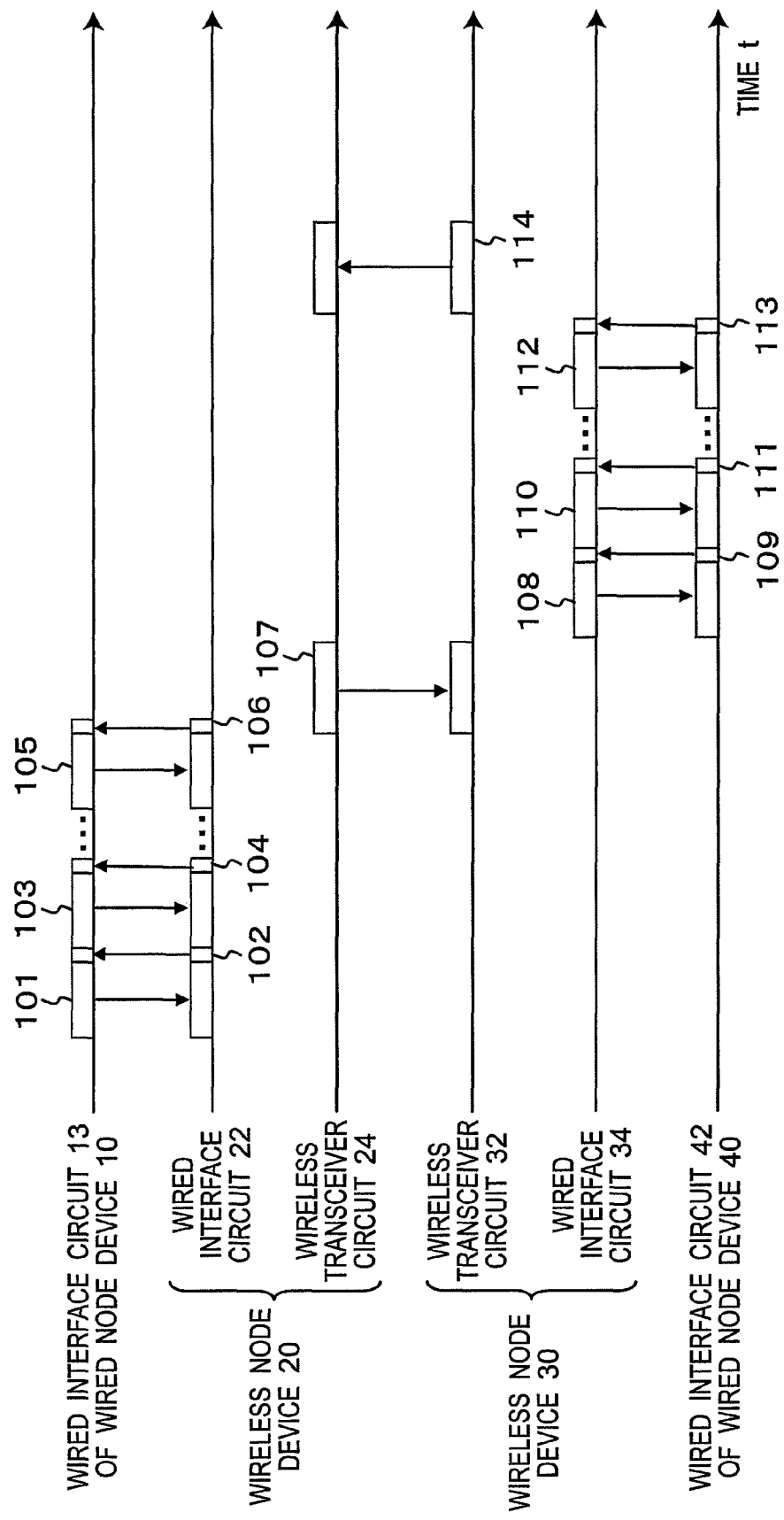
FIG. 6 is a diagram showing a sequence for the case of correct transmission in the wireless communication system of FIG. 1.
Figure 7:
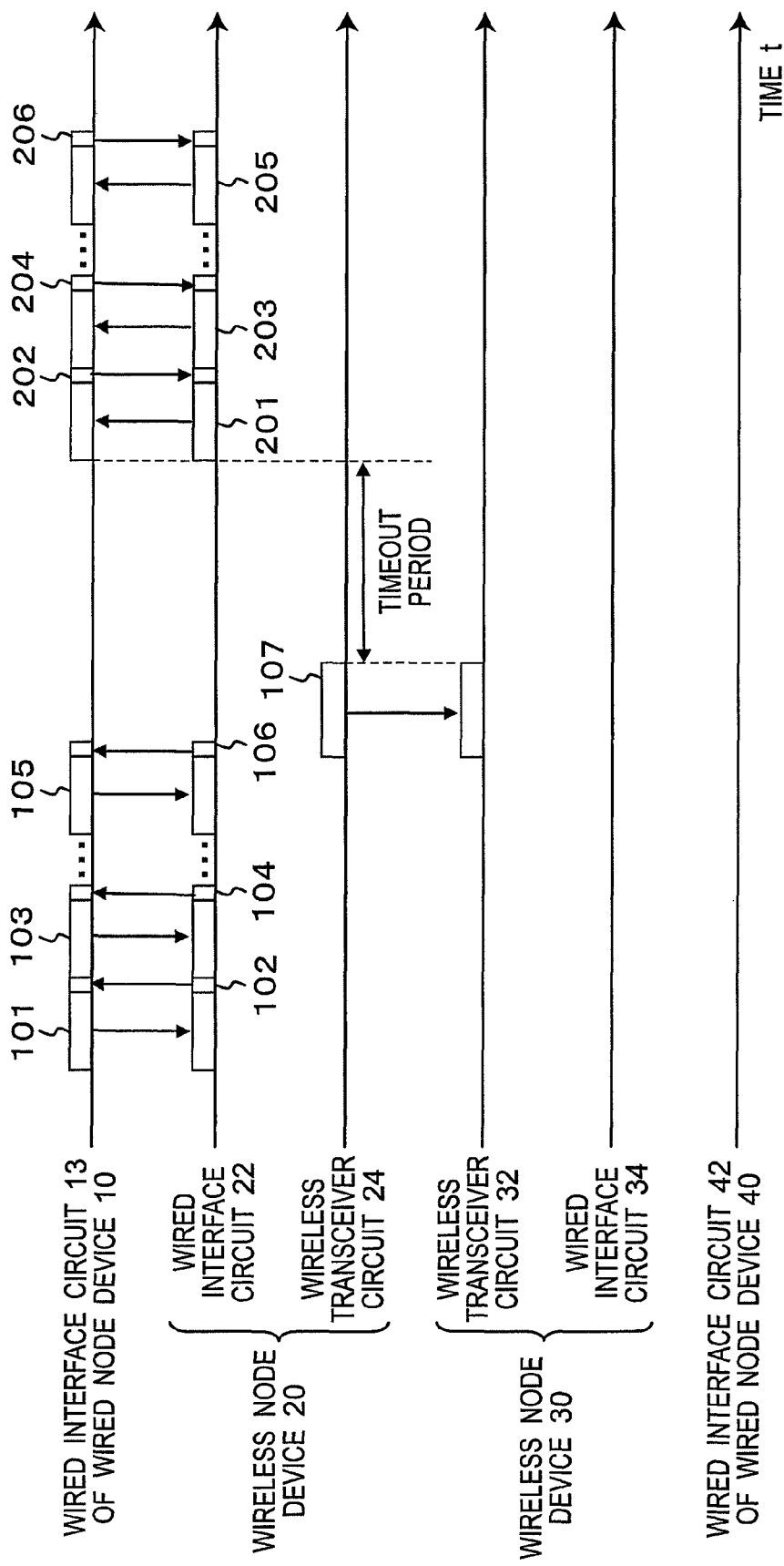
FIG. 7 is a diagram showing a sequence for the case of incorrect transmission in a wireless segment between the wireless node devices 20 and 30 in the wireless communication system of FIG. 1.
Figure 8:
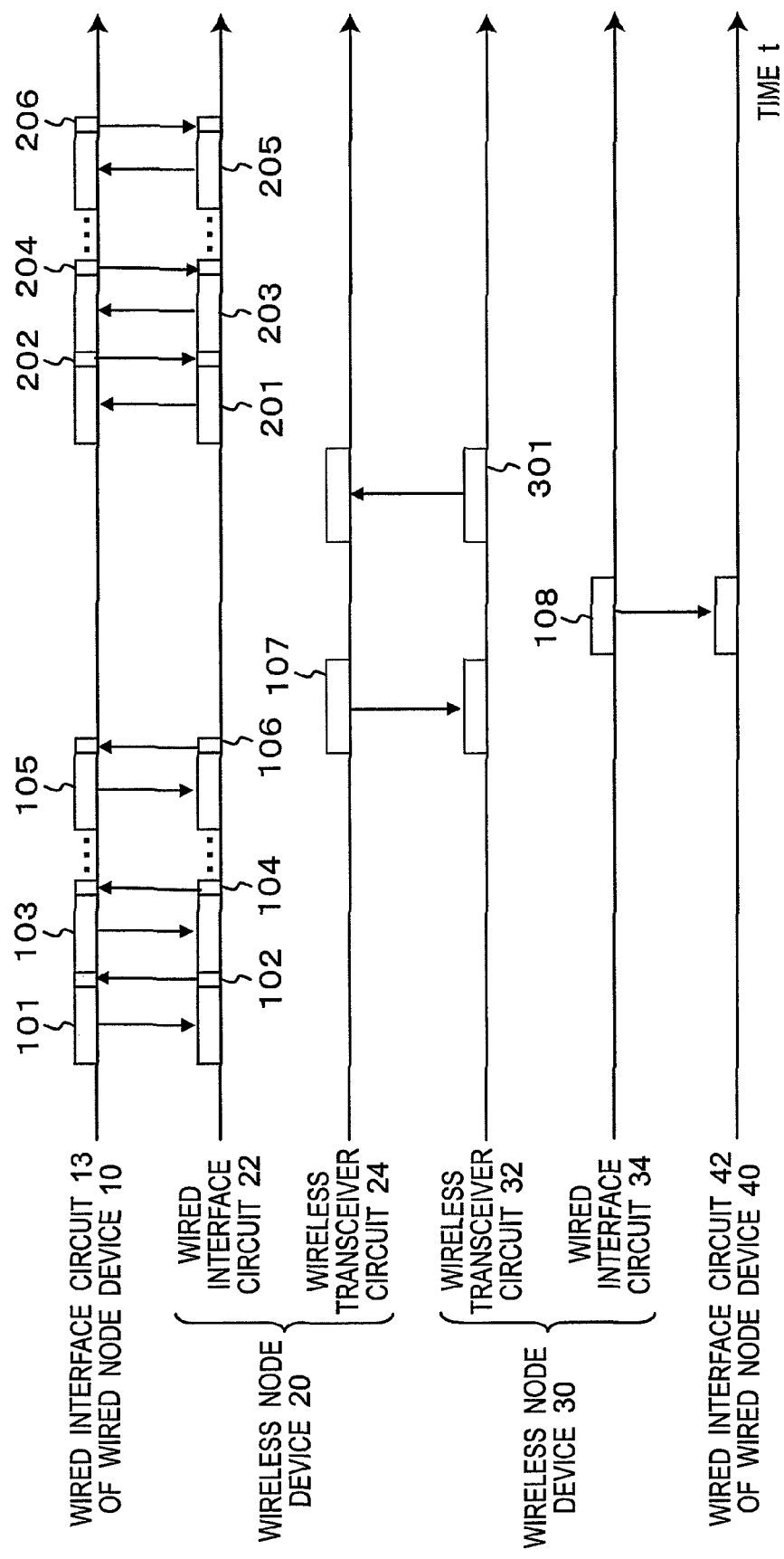
FIG. 8 is a diagram showing a sequence for the case of incorrect transmission in a wired segment between the wireless node device 30 and a wired node device 40 in the wireless communication system of FIG. 1.
Figure 9:
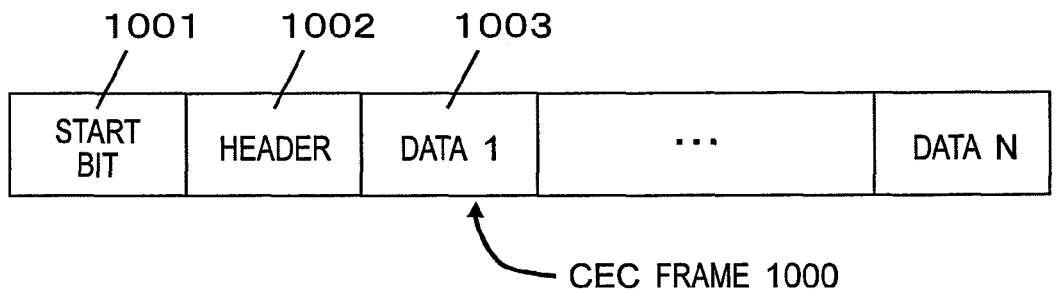
FIG. 9 is a diagram showing an exemplary format of a CEC frame 1000 according to a prior art example and the embodiment of the present invention.
Figure 10:
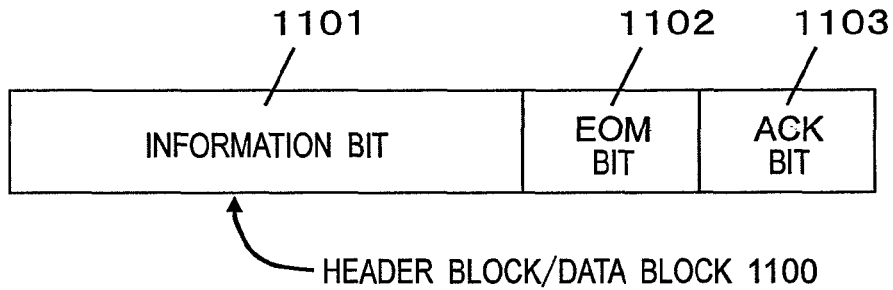
FIG. 10 is a diagram showing an exemplary format of a header block/data block 1100 according to a prior art example and an embodiment of the present invention.

Next, with reference to FIGS. 6 to 8, discuss transmission sequences in the wireless communication system for the case in which the wireless node devices 20 and 30 operate in the above-described manner. Referring to FIGS. 6 to 8, an exemplary case is described in which the wired node device 10 sends to the wired node device 40 a CEC message composed of N data blocks, where the horizontal axis represents time t. It is assumed that address information on the wireless node device 30301 and the wired node device 40 is already stored in the node information table in the node information memory 21B of the wireless node device 20.

Firstly, discuss a transmission sequence of FIG. 6. FIG. 6 shows a sequence for the case in which a CEC message is correctly transmitted from the wired node device 10 to the wired node device 40. The wired interface circuit 13 of the wired node device 10 outputs a start bit (not shown in FIGS. 6 to 8) followed by a header block 101 of a CEC message, to the wireless node device 20. In the wired interface circuit 22 of the wireless node device 20, the start bit followed by the header block 101 are inputted, and thereafter, "0" is inputted at an EOM bit 1102 (not shown in FIGS. 6 to 8), and the CEC controller 21A of the wireless node device 20 determines that a data block 103 is to be inputted after the header block 101. Then, an ACK bit 1103 is inputted to the wired interface circuit 22 of the wireless node device 20. Since the EOM bit 1102 is "0", the wired interface circuit 22 outputs "0" in response to the ACK bit 1103, and thus sends an ACK 102 from the wireless node device 20 to the wired node device 10. Now, the CEC controller 21A of the wireless node device 20 checks a destination logical address of the header block 101, and obtains a wireless address associated with the destination logical address of the wired node device 40 from the node information table in the node information memory 21B. Further, the CEC controller 21A of the wireless node device 20 stores an information bit 1101 in the header block 101, in the data field 1603 of the transmission data memory 24A.

Subsequently, the first data block 103 is inputted from the wired interface circuit 13 of the wired node device 10 to the wired interface circuit 22 of the wireless node device 20. Thereafter, "0" is inputted at an EOM bit 1102 (not shown in FIGS. 6 to 8), and the CEC controller 21A of the wireless node device 20 determines that a data block is to be further inputted after the present data block. Since the EOM bit 1102 is "0", the wired interface circuit 22 outputs "0" in response to an ACK bit 1103 in the data block 103, and thus sends an ACK 104 from the wireless node device 20 to the wired node device 10. Now, an information bit 1101 in the data block 103 is stored in the data field 1603 of the transmission data memory 24A. The same operation is performed on each data block up to an (N−1)th data block.

An Nth data block 105 is inputted from the wired interface circuit 13 of the wired node device 10 to the wired interface circuit 22 of the wireless node device 20. Then, "1" is inputted at an EOM bit 1102 (not shown in FIGS. 6 to 8), and the CEC controller 21A of the wireless node device 20 determines that the present data block is the last data block. Thereafter, the wired interface circuit 22 outputs "0" in response to an ACK bit 1103 in the data block 105, and thus sends an ACK 106 from the wireless node device 20 to the wired node device 10. At the same time, the CEC controller 21A of the wireless node device 20 composes a wireless data packet 107 from the information bits 1101 in the header block 101 and the data blocks 0 to N (103 to 105) which are stored in the data field 1603 of the transmission data memory 24A, and instructs the wireless transceiver circuit 24 to send the wireless data packet to the wireless address of the wired node device 40 which is obtained from the node information table in the node information memory 21B. Thus, a wireless data packet 107 is sent from the wireless node device 20 to the wireless node device 30. In addition, an originating logical address, a destination logical address, and data which are contained in the wireless data packet 107 are stored in the transmission data memory 24A.

Then, the wireless node device 30 receives the wireless data packet 107 sent from the wireless node device 20. The CEC controller 31A of the wireless node device 30 composes a header block 108 and data blocks 0 to N (110 to 112) from the received wireless data packet 107, and outputs a start bit (not shown) from the wired interface circuit 34, and thereafter, outputs the header block 108 and the data blocks 0 to N (110 to 112) sequentially. When "0" is returned in response to every ACK bit in the blocks ranging from the header block 108 to the data block N (112) (this is shown in FIG. 6 as ACKs 109, 111, and 113 from the wired node device 40 to the wireless node device 30), the CEC controller 31A of the wireless node device 30 instructs the wireless transceiver circuit 32 to send a wireless ACK packet 114 to the wireless node device 20.

When the CEC controller 21A of the wireless node device 20 receives the wireless ACK packet 114 from the wireless node device 30, the CEC controller 21A ends the process.

Next, discuss a transmission sequence of FIG. 7. FIG. 7 shows a sequence for the case in which a CEC message sent from the wired node device 10 to the wired node device 40 cannot be correctly transmitted in the wireless segment (i.e., a segment between the wireless node devices 20 and 30). Referring to FIG. 7, the same operation as that of the transmission sequence of FIG. 6 is performed, up to steps of sending a header block 101 and data blocks 0 to N (103 to 105) from the wired node device 10 to the wireless node device 20, and sending a wireless data packet 107 from the wireless node device 20 to the wireless node device 30.

After the CEC controller 21A of the wireless node device 20 sends the wireless data packet 107 by the wireless transceiver circuit 24, the CEC controller 21A waits to receive a wireless ACK packet from the wireless node device 30. When the CEC controller 21A of the wireless node device 20 has not received either of a wireless ACK packet and a wireless NACK packet from the wireless node device 30 even after expiration of a predetermined timeout period, the CEC controller 21A instructs the wired interface circuit 22 to send a receiving error message to the wired node device 10. The receiving error message is composed in a format including a header block 201, and subsequent blocks 0 to N of the receiving error message (blocks 203 to 205). In this case, each time the wired interface circuit 13 of the wired node device 10 receives the respective blocks of the header block 201 and the blocks 0 to N of the receiving error message (blocks 203 to 205) from the wireless node device 20, the wired interface circuit 13 returns "0", in response to an ACK bit, and thus sends ACKs 202, 204, and 206 from the wired node device 10 to the wireless node device 20. As described above, when a CEC message sent from the wired node device 10 to the wired node device 40 cannot be correctly transmitted in the wireless segment, a receiving error message is sent from the wireless node device 20 to the wired node device 10.

Next, discuss a transmission sequence of FIG. 8. FIG. 8 shows a sequence for the case in which a CEC message sent from the wired node device 10 to the wired node device 40 cannot be correctly transmitted in the wired segment (i.e., the HDMI cable 52) between the wireless node device 30 and the wired node device 40. Referring to FIG. 8, the same operation as that in the transmission sequence of FIG. 6 is performed, from step of sending a header block 101 and data blocks 0 to N (103 to 105) from the wired node device 10 to the wireless node device 20, to step of a header block 108 from the wireless node device 30 to the wired node device 40.

The CEC controller 31A of the wireless node device 30 composes a header block 108 from a wireless data packet 107 received from the wireless node device 20, and outputs a start bit (not shown) from the wired interface circuit 34, and thereafter, outputs the header block 108. When "0" is not returned in response to an ACK bit in the header block 108, the CEC controller 31A of the wireless node device 30 retransmits the header block a plurality of times (in FIG. 8, the retransmitted header block is omitted). When "0" is not returned in response to the ACK bit even retransmitting a plurality of times, the CEC controller 31A of the wireless node device 30 instructs the wireless transceiver circuit 32 to send a wireless NACK packet 301 to the wireless node device 20. Thus, the wireless NACK packet 301 is sent from the wireless transceiver circuit 32.

When the CEC controller 21A of the wireless node device 20 receives the wireless NACK packet 301 from the wireless node device 30, the CEC controller 21A instructs the wired interface circuit 22 to send a receiving error message. Thus, the receiving error message (which is the same as that for the case of FIG. 7) is sent from the wired interface circuit 22.

It is noted that in FIG. 8 even when an ACK 109 is sent for the header block 108, if an ACK is not returned for any of data blocks 0 to N (110 to 112), then the CEC controller 31A of the wireless node device 30 instructs the wireless transceiver circuit 32 to send a wireless NACK packet 301 to the wireless node device 20.

MODIFIED PREFERRED EMBODIMENTS

The wireless communication system of the embodiment according to the present invention is not limited to be configured as shown in FIG. 1, and may further include other wired node devices and/or wireless node devices. For example, other Source devices may be further connected to the wired interfaces of the wireless node devices 20 and 30 and the wired node device 40, or other Source devices may be further connected through the wireless interfaces. It is noted that the wireless node devices 20 and 30 shown in the present embodiment are provided with the wired interface circuits 22 and 34, but do not necessarily have to be provided with the wired interface circuits 22 and 34.

It is also noted that the wireless node devices 20 and 30 may be configured without the video and audio processing circuits 23 and 33, and configured as wireless adapter devices to be connected to existing prior-art wired node devices.

It is noted that an address management process should be performed by any one of a plurality of wireless node devices in a wireless communication system. Therefore, the wireless node device 20, instead of the wireless node device 30, may include an address management controller. Alternatively, both of the wireless node devices 20 and 30 may include an address management controllers, and one of these address management controllers may perform an address management process.

It is noted that identifiers for uniquely identifying devices can be used instead of MAC addresses used in the present embodiment.

It is noted that the packet format and table format shown in the present embodiment are exemplary, and therefore, other formats can be used as long as the format provides the same operational effects.

INDUSTRIAL APPLICABILITY

The wireless communication device and the wireless communication system according to the present invention have a specific effect enabling to transmit control messages among node devices over the air, and are useful as a wireless communication system in which node devices operate in a cooperative manner, etc.

The invention claimed is:

1. A wireless communication device for transmitting and receiving CEC messages of HDMI, the wireless communication device comprising:
   a wired interface;
   a wireless interface;
   a node information memory for storing information on node devices connected through the wired interface and information on node devices connected through the wireless interface; and
   a controller for controlling transmission and reception through the wired interface and the wireless interface, based on contents stored in the node information memory,
   wherein when the wired interface receives a CEC message destined for a node device connected through the wireless interface, the controller outputs an ACK signal for the received CEC message from the wired interface, and transmits a wireless data packet containing contents of the CEC message from the wireless interface, and
   wherein when the wireless interface receives a wireless NACK packet indicating that the wireless data packet has not been correctly transmitted, the controller does not transmit CEC messages destined for the node device connected through the wireless interface.

2. The wireless communication device as claimed in claim 1,
   wherein when the wireless interface has not received a wireless ACK packet even after expiration of a predetermined period of time from transmitting the wireless data packet, the controller outputs a receiving error message from the wired interface to an originating node device of the CEC message, the receiving error message indicating that the wireless ACK packet has not been received.

3. The wireless communication device as claimed in claim 1,
   wherein when the wireless interface receives the wireless NACK packet, the controller outputs a receiving error message from the wired interface to an originating node device of the CEC message, the receiving error message indicating that the wireless NACK packet has been received.

4. The wireless communication device as claimed in claim 1,
   wherein when, even after expiration of a predetermined period of time from transmitting the wireless data packet, the wireless interface has not received either of a wireless ACK packet, and the wireless NACK packet, the controller outputs a receiving error message from the wired interface to an originating node device of the CEC message, the receiving error message indicating that both of the wireless ACK packet and the wireless NACK packet have not been received.

5. The wireless communication device as claimed in claim 2,
   wherein the receiving error message is a Feature Abort message.

6. The wireless communication device as claimed in claim 2,
   wherein the receiving error message contains a destination address of the wireless data packet.

7. The wireless communication device as claimed in claim 2,
wherein the receiving error message contains a field for indicating a content of error.

8. A wireless communication device for transmitting and receiving CEC messages of HDMI, the wireless communication device comprising:
a wired interface;
a wireless interface; and
a controller for controlling transmission and reception through the wired interface and the wireless interface,
wherein when the wireless interface receives a wireless data packet destined for a node device connected through the wired interface, the controller outputs a CEC message containing contents of the received wireless data packet from the wired interface, and
wherein when the wired interface has not received an ACK signal for the CEC message even after expiration of a predetermined period of time from outputting the CEC message from the wired interface, the controller transmits from the wireless interface a wireless NACK packet indicating that the wireless data packet has not been correctly transmitted.

9. A wireless communication system for transmitting and receiving CEC messages of HDMI, the wireless communication system comprising:
a first wireless communication device comprising:
a first wired interface;
a first wireless interface;
a node information memory for storing information on node devices connected through the first wired interface and information on node devices connected through the first wireless interface; and
a first controller for controlling transmission and reception through the first wired interface and the first wireless interface, based on contents stored in the node information memory; and
a second wireless communication device comprising:
a second wired interface;
a second wireless interface; and
a second controller for controlling transmission and reception through the second wired interface and the second wireless interface,
wherein in the first wireless communication device, when the first wired interface receives a CEC message destined for a node device connected through the first wireless interface, the first controller outputs an ACK signal for the received CEC message from the first wired interface, and transmits a wireless data packet containing contents of the CEC message from the first wireless interface, and when the first wireless interface receives a wireless NACK packet indicating that the wireless data packet has not been correctly transmitted, the first controller does not transmit CEC messages destined for the node device connected through the first wireless interface, and
wherein in the second wireless communication device, when the second wireless interface receives a wireless data packet destined for a node device connected through the second wired interface, the second controller outputs a CEC message containing contents of the received wireless data packet from the second wired interface, and when the second wired interface has not received an ACK signal for the CEC message even after expiration of a predetermined period of time from outputting the CEC message from the second wired interface, the second controller transmits from the second wireless interface a wireless NACK packet indicating that the wireless data packet has not been correctly transmitted.

* * * * *